Figure 1:
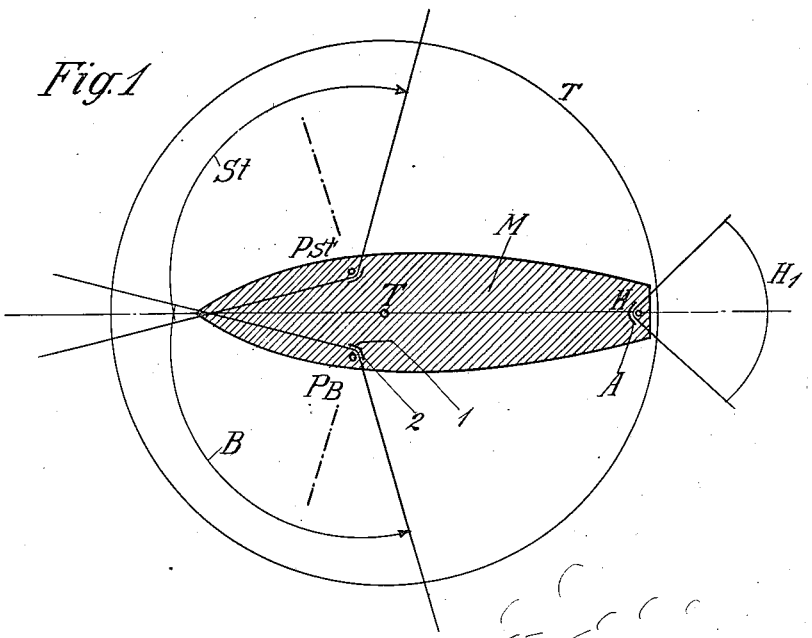

Feb. 21, 1933.   W. HAHNEMANN   1,898,831
ARRANGEMENT FOR INDICATING THE POSITION OF VESSELS
Filed Jan. 6, 1930

Inventor:
Walter Hahnemann
by
Attorney

UNITED STATES PATENT OFFICE

WALTER HAHNEMANN, OF BERLIN-MARIENFELDE, GERMANY, ASSIGNOR TO C. LORENZ AKTIENGESELLSCHAFT, OF BERLIN-TEMPELHOF, GERMANY

ARRANGEMENT FOR INDICATING THE POSITION OF VESSELS

Application filed January 6, 1930, Serial No. 418,743, and in Germany January 24, 1929.

In navigation, collisions of vessels are avoided, as is well known, by making the course of the ship distinguishable by means of position lights. According to the international provisions, a red light is carried at the port side (left in the direction of travel) and a green light at the starboard side. These position lights are so arranged that they spread over a certain angular space which begins about 20 degrees abaft the thwart (vertical on the centre line of the ship) and reaches to about 7 degrees across the bow to the other side. By this means, it is possible to perceive from the color of the light whether one is located sideways from the ship and in which direction of travel to the same or whether one is in front of the bow of the ship. Since this arrangement, however, fails when fog arises, the ships must under certain circumstances lie perfectly still since, by the well-known indication with the fog-horn, they are not in the position to detect what course the other ship is taking.

For this reason, it has been proposed to use subaqueous sound signalling apparatus, by means of which signals are emitted, similarly to the position lights. Such arrangements, however, are exceedingly expensive and complicated since they are built into the side of the ship's hull below the water line and must be suitable for emitting and receiving the sound waves in definite directions.

In order to facilitate steering towards a harbour, wireless telegraph has often been used as an auxiliary but it is not possible to use the previous systems for indicating the position, since the wave-lengths used are unsuitable for this purpose. According to the invention, there are chosen electric waves of such magnitude that they are propagated according to optical laws, and, similarly to the position lights, can be used in connection with directive arrangements. Such waves must, in this case, be so small that, similarly to light, they can easily be screened and reflected.

By extensive experiments, it could be ascertained that the range of ultra-short waves, that is to say waves less than ten metres in length can be calculated accurately since the same are propagated according to the same laws as light. If a transmitter of such waves is arranged at a certain height above the earth's surface, then its greatest range for a receiver installed on the earth's surface is given by the tangent from the transmitter to the earth's surface. If the receiver is located at exactly the same height as the transmitter, then accordingly, the range is extended to double, since the tangent to the earth's surface can only meet a receiver which is arranged at exactly the same height as the transmitter. The energy, in this case, is of small importance, and may be kept very small. These ultra-short waves can be screened, collected and reflected in any desired direction, with means such as are used in the case of light-rays. These arrangements, particularly reflective surfaces, are chosen for this purpose in such a way that their dimensions are as large as possible in relation to the wave-length. These means can be accomplished without difficulty, without obtaining too great dimensions of the reflective surfaces, since, according to the invention, the wave-length is chosen as small as possible and amounts to not larger than several meters, still better, one meter.

Figure 2:
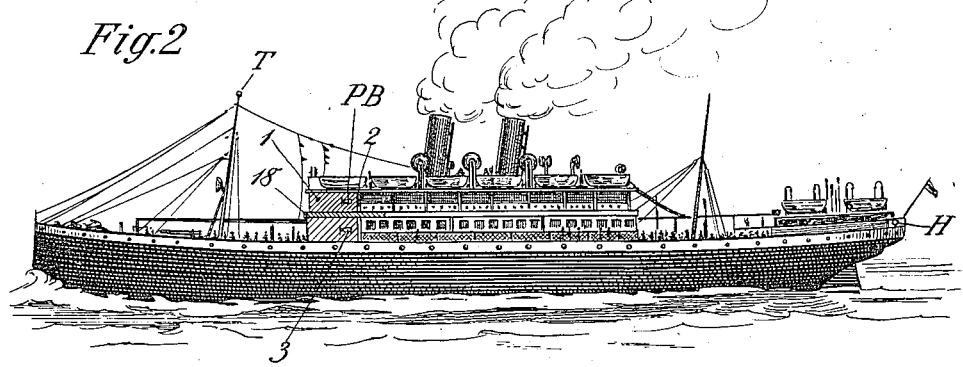
Figure 3:
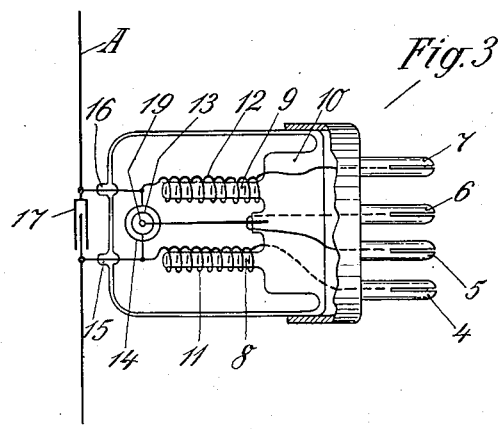

A mode of execution of the arrangement according to the invention is illustrated in the drawing by way of example, wherein Figure 1 is a diagrammatic view of the radiation of ultra-short waves on board ship within certain regions, Figure 2 is a side view of a ship, showing the mounting of the transmitter and receiver, and Figure 3 is a side elevation of the transmitting means for ultra-short waves.

The invention is described in the following by way of example. On the ship illustrated in Figure 1 in plan, at the points $P_B$ and $P_{ST}$, otherwise provided for the position lanterns, on the port and starboard sides there are installed two transmitters, the beam of rays of which is limited, according to the international regulations to the space of 120°.

The transmitters, in this case, are so arranged, for instance, within angular screening walls S, that their radiation is effected only within this sector. The port transmitter constantly emits, for instance, the signal ─ . while at the same time the starboard transmitter emits the signal .─. If a vessel is located within one of these radiation cones, then it receives either the port or the starboard signal alone, or else both signals, from which its position relative to the ship is obtained. In this case, both signals, if they are located in front of the bow, may advantageously blend into a continuous dash. Instead of transmitting two different signals, it is possible to work on both sides with different wave-lengths, but then the receiving apparatus must be constructed correspondingly for both wave-lengths. In order to guarantee the maintenance of the required angle of radiation, it is only necessary to install the transmitters on board in such a way that sufficiently large and suitable reflective surfaces are present behind them. This, on account of the small size of the wave-lengths chosen, can easily be obtained on a large steamer because the deck structures will mostly have sufficiently large metallic surfaces in relation to the wave-length. If, for instance, a one meter wave is used, then it is always possible to find or else to arrange a suitable reflective surface several meters in length. In the majority of cases it will be possible to obtain, without difficulty, the required sector of radiation by building in corresponding walls set at the correct angle.

In Figure 2 a steamer is shown in side view, from which latter follows the installation of the transmitting and receiving apparatus on the port side. The transmitter $P_B$ is mounted on the upper deck in front of the reflecting surface S. The portion 1 of the reflective surface S is formed by the wall of the deck structures proper, while portion 2 is provided artificially and transverse to the former. The port and starboard transmitters $P_B$ may be of the general type as shown in Patent 1,735,053, the reflector thereof being replaced by the reflecting surface S formed by walls 1 and 2 of the vessel. The port and starboard receivers 3 positioned on the deck below the respective transmitters may be of the general type as shown in the said patent, the reflector of said patent being replaced by the reflecting surface formed by walls of the vessel in the same manner as for the transmitter.

While any of the known short wave transmitters can be used, the employment of the transmitter illustrated in Figure 3 offers special advantages, since it excels by a marked simplicity. All parts of the oscillatory circuit are formed by the tube proper, so that only the connecting plugs for the leads of the current supply and the antenna respectively must be provided. The plug pins for the leads supplying the current are denoted by 4, 5, 6, 7. On two glass supports 8 and 9 integral with the squash 10, are wound choking coils 11 and 12 in the anode and grid circuit. When generating ultra-short waves it is necessary, to provide choking coils within the said tube as closely as possible towards the electrodes, which coils will take care that no high frequency vibrations will enter the leads of the current supply. The anode 14 is constructed in known manner and is likewise held by the support 8, and it also surrounds the grid 13. In the example illustrated there are arranged no choking coils, while in practice it will often become necessary to make use of these.

As closely as possible to the grid and the anode leading out cables 15 and 16 are arranged through which pass the wires leading to a small freely suspended excitation aerial A. For the purpose of tuning the said excitation aerial a capacity is arranged between 15 and 16. The leads supplying the current, that is to say batteries A and B are connected to the plug pins of the tube. These batteries may be located at any desired place in the ship.

In order to fix the direction of the course of a vessel sailing in the opposite direction provided with such an installation, it is necessary, furthermore, to arrange corresponding receivers next to the transmitters. These receivers can be screened from one another, for instance, likewise by means of surfaces, the dimensions of which are large in relation to the wave-length, so that the port receiver can receive only signals which come from the port side and correspondingly the starboard receiver only those that come from the starboard. This problem can be solved at the same time by the reflective surfaces (or the body of the ship) of the transmitters, so that the arrangement is thus very simple. In order to screen the transmitter and the receiver, which are arranged on the same side of the ship, from one another, for instance, the deck may be used, by the transmitter being arranged above the deck and the receiver below the same, so that metallic parts of the deck serve as a screening surface. In the arrangement shown in Figure 2 the receiver 3 is mounted below the transmitter $P_B$. Between both these apparatus is the deck 18, which acts as screening surface.

It is also possible to determine the location of the vessel travelling in an opposite direction, by the aid of receiving apparatus having directional properties, in addition to the port and starboard receivers. It will not always be sufficient, by the above-mentioned receivers installed at port and starboard, to ascertain that a ship is located on one of the two sides or ahead but it will often be desired to fix the exact position of the same. This can be done by the aid of a rotatable receiving arrangement which, for instance, is manipulated from the bridge. This arrangement would correspond to the present-day customary location of the position lights of the vessel sailing in an opposite direction. If the position of the position light of the vessel sailing in an opposite direction does not alter in relation to the body of the particular ship, there exists, as well-known, the danger of collision since the two courses must cross one another. For instance, for this purpose, a receiver with a rotatable parabolic reflector is used, which, since the wave-length is small, can be made sufficiently small and easily movable.

The great advantage of the arrangement according to the invention over the well-known directional receiver, wherein frames are made use of, consists in the fact that it can be ascertained without difficulty from which direction the arriving waves are actually coming. Moreover, with the frame devices, due to the metallic masses of the ship, compensating arrangements are necessary which call into question the use of frame devices for rapid determinations such as are necessary in navigation. If, however, according to the invention, transmitters and receivers for small wave-lengths are used, then the arrangement is exceedingly simple, since such transmitters consist substantially only of one tube and several small oscillatory circuits arranged within or outside the same and of directing means (reflectors, screening walls) which can easily be arranged on board. Moreover, these waves also have the advantage that, as already stated, they have a definite local range which, above all is given by the length of the tangent from the installation point to the surface of the earth. This circumstance favors the use of these waves to a great extent for the purpose stated. For the longer wave-lengths, the range of the waves is not so definite, but sometimes large, other times smaller and thus vessels would receive signals which are also still considerably outside the range of danger or at quite another place (particularly in the case of so-called short waves), which are reflected by the Heaviside layer.

The use of short waves, however, is in no way limited to the position lights but the most varied indications can be made concerning the ship with the aid of the same. Herein there lies a great advantage over the previous system with the aid of light-signals. Only three colors, as is well-known can be distinguished perfectly at sea, red and green for the position lights, while a yellow lamp is generally carried at the masthead. This masthead lamp serves for indicating the presence of a ship also of vessels coming up behind. Larger ships, also carry moreover, a white stern light.

Instead of the masthead light, according to the invention, a transmitter may be arranged which radiates radially in all directions, while instead of the stern light a transmitter which only radiates to aft, may be arranged. In the accompanying drawing, the radiation area of the masthead transmitter is characterized by T, that of the stern transmitter, the screening surface of which bears the letter A, by H. With these four different lights, the ordinary light signals are exhausted. The masthead transmitter T may be of the general type as shown in Patent 1,735,053, but without the reflector. The stern transmitter H may also be of the type shown in the said patent. With the use of short waves, according to the invention, it is possible, however, to make many further indications in an extremely simple manner. It is possible, for instance, to give at the same time the name of the ship from the masthead transmitter in the international four-letter abbreviation, also perhaps the speed and kind of ship, besides the nature of its course. In order to transmit these signals, a simple automatic Morse transmitter may be used.

Further, such a masthead transmitter advantageously completes the arrangement of the fog sirens, since even in the case of fog, the masthead transmitter will constantly be heard. It is perhaps of advantage, in view of the fog, to arrange a further transmitter the range of which is so limited by its height that it is heard only by a ship which is in danger of a collision by reason of its close proximity. There may be located on the ship, for this purpose, automatic receiving arrangements which release a warning signal.

It is obvious that the entire arrangement hitherto described is only useful in practice if the same can be operated and supervised from the commanding bridge. Preferably those of the two signals received on the different sides of the ship must be constantly indicated on the bridge. For instance, it is conceivable to connect both receivers with a reverse switching device which at one time connects the one and another time the other with a loud-speaker. If the vessel sailing in an opposite direction is located in the port sector, then, with interruptions, the signal coming in to port will be audible in the loud-speaker. Now in order to ascertain whether the vessel sailing in an opposite direction is located on the port or starboard side of the particular vessel it is now necessary to put the automatic reverse switching arrangement out of action and to connect for instance, by means of push-buttons, the starboard or port receiver with the loud-speaker. By this means, it is possible to ascertain whether it is necessary or not to lay on rudder with one's own vessel according to the right of sea-way.

With this arrangement there can be connected an automatic device which, on approaching a vessel sailing in an opposite direction then releases a warning signal if, according to the right of sea-way, the particular vessel is compelled to turn aside. If, for instance, a vessel sailing in an opposite direction comes up to port and its starboard signal is audible in the receiver, then according to the right of sea-way, the particular vessel must put on rudder, that is to say, only in this case is an automatic warning arrangement brought into response. For the other courses of the ρ, of course, the arrangement can be used according to the sense.

If the system according to the invention is to be used, then the same must work just as certainly as the previously used lights, that is to say, the operation of the transmitting and the receiving apparatus must be constantly supervised. It is possible either to mount next to the transmitters special receivers, which, on account of the smallness of the waves, consist substantially only of one tube, and by this means, to supervise the radiation of these transmitters, that is to say, at an interruption of the radiation, to release warning signals, or it is still simpler to conduct a part of the energy radiated by the transmitters to the receivers located on board on the same side and by this means, to supply it by the same receivers which serve for receiving the signals of the vessel sailing in an opposite direction.

The working of the arrangement according to the invention is no way influenced if in the above-mentioned loud-speaker on the commanding bridge there can constantly be heard subdued signals which are caused by the particular transmitters, and thus indicate to the man on duty that the particular installation is still in order. The cessation of the signals indicates that either the transmitting or receiving apparatus is not in order. If, say, with a small portable apparatus, it is ascertained that the particular transmitter is still working, then the fault may lie only in the receiving installation. It is obvious that the given examples for warning signals can be extended as desired without departing from the scope of the idea of the invention.

I claim:

1. In an arrangement for indicating the position of ships, the combination of a short wave wireless transmitter and a wireless receiver mounted one above the other on a ship, and an electromagnetic screen formed by metallic surfaces of the ship's structure separating the transmitter and the receiver.

2. In an arrangement according to claim 1 wherein reflectors for the transmitter and receiver are formed by metallic surfaces of the ship's structure.

3. In an arrangement according to claim 1 wherein the transmitter and the receiver are located on adjacent decks of the ship with the intervening metallic deck forming said screen, and reflectors for the transmiter and receiver formed by metallic surfaces of the ship's structure.

4. A system for indicating the position of ships comprising short wave wireless signalling apparatus located on each side of a ship in positions corresponding to the port and starboard lights, each signalling apparatus including a transmitter and a receiver positioned one above the other on different decks and electromagnetically shielded the one from the other by the intervening deck plate, and a reflector for each transmitter and for each receiver formed by metallic surfaces of the ship's structure.

5. A system according to claim 4 wherein the reflectors are so shaped that the respective beams of waves transmitted are limited to sectors of approximately 120 degrees.

6. A system according to claim 4 wherein a transmitter having a position corresponding to the masthead light radiates waves uniformly to all sides, a transmitter having a position corresponding to the ship's stern light, and a reflector for the stern transmitter to limit its radiation to a predetermined area aft.

In testimony whereof I have affixed my signature.

WALTER HAHNEMANN.